United States Patent
Adinarayan et al.

(10) Patent No.: US 8,954,984 B2
(45) Date of Patent: Feb. 10, 2015

(54) ENVIRONMENTALLY AWARE LOAD-BALANCING

(75) Inventors: Geetha Adinarayan, Bangalore (IN); Andrew J. Bernoth, Victoria (AU); Sateesh S. Kannegala, Bangalore (IN); Gandhi Sivakumar, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/450,658

(22) Filed: Apr. 19, 2012

(65) Prior Publication Data

US 2013/0283289 A1    Oct. 24, 2013

(51) Int. Cl.
| | |
|---|---|
| *G06F 9/50* | (2006.01) |
| *G06F 11/30* | (2006.01) |
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G01K 17/00* | (2006.01) |
| *G06F 1/00* | (2006.01) |

(52) U.S. Cl.
USPC ............ 718/105; 700/291; 702/136; 713/300

(58) Field of Classification Search
None
See application file for complete search history.

(56) References Cited

U.S. PATENT DOCUMENTS

| | | | |
|---|---|---|---|
| 7,003,640 B2 | 2/2006 | Mayo et al. | |
| 7,360,102 B2 | 4/2008 | Inoue | |
| 7,447,920 B2 * | 11/2008 | Sharma et al. | 713/300 |
| 7,552,346 B2 | 6/2009 | Aguilar, Jr. et al. | |
| 7,596,430 B2 | 9/2009 | Aguilar, Jr. et al. | |
| 7,705,721 B1 * | 4/2010 | Chen et al. | 340/518 |
| 7,783,909 B2 | 8/2010 | Hatasaki et al. | |
| 2003/0079151 A1 | 4/2003 | Bohrer et al. | |

(Continued)

FOREIGN PATENT DOCUMENTS

WO    2011076486    6/2011

OTHER PUBLICATIONS

Tan et al., Software Architectural Transformations: A New Approach to Low Energy Embedded Software, Proceedings of the Design Automation and Test in Europe Conference and Exhibition, 2003 IEEE, 1530-1591/03, 6 pages.

(Continued)

*Primary Examiner* — Abdullah Al Kawsar
*Assistant Examiner* — Dar-Eaum Nam
(74) *Attorney, Agent, or Firm* — Schmeiser, Olsen & Watts, LLP; John Pivnichny

(57) ABSTRACT

A method and associated systems for the environmentally aware load-balancing of components of a multi-component power-consuming system. The environmentally aware load-balancer receives continually updated values from at least two environmental sensors that monitor and report the values of environmental metrics that characterize components of the power-consuming system and the environments within which those components are located. When the load-balancer receives a task request directed to the power-consuming system, the load-balancer selects a balanced workload allocation as a function of the values of the received environmental metrics and communicates that balanced workload allocation to a routing mechanism. The routing mechanism then uses the communicated balanced workload allocation to determine which component or components of the power-consuming system should receive the task request.

7 Claims, 6 Drawing Sheets

(56) References Cited

U.S. PATENT DOCUMENTS

| | | | |
|---|---|---|---|
| 2005/0125701 A1 | 6/2005 | Hensbergen et al. | |
| 2007/0260417 A1* | 11/2007 | Starmer et al. | 702/136 |
| 2007/0300204 A1* | 12/2007 | Andreev et al. | 717/104 |
| 2008/0303676 A1* | 12/2008 | Kettler et al. | 340/584 |
| 2009/0076658 A1* | 3/2009 | Kinnis | 700/277 |
| 2009/0228726 A1* | 9/2009 | Malik et al. | 713/320 |
| 2009/0276528 A1* | 11/2009 | Pienta et al. | 709/226 |
| 2011/0035072 A1* | 2/2011 | Jackson | 700/291 |

OTHER PUBLICATIONS

Antti Autere, New Online Power-aware Routing Algorithms in Wireless Networks, Helsinki Univ. of Tech., Dept. of Computer Science and Engineering, 2 pages, Oct. 2004.

Gelenbe et al., A Power-Aware Routing Algorithm, School of Electrical Engineering and Computer Science, University of Central Florida, Orlando, FL 32816, 7 pages, 2003.

Pistoia et al., IBM WebSphere Performance Pack: Load Balancing with IBM SecureWay Network Dispatcher, [online] URL: redbooks.ibm.com, SG24-5858-00, 425 pages, Oct. 29, 1999.

* cited by examiner

US 8,954,984 B2

ENVIRONMENTALLY AWARE LOAD-BALANCING

TECHNICAL FIELD

The present invention relates to load-balancing components of a multi-component power-consuming system.

BACKGROUND

Temperature-sensitive components of a multi-component power-consuming system are designed to operate at temperatures that fall within component-specific optimal temperature ranges. If a component's operating temperature strays outside the component's optimal temperature range, then that component may run less efficiently, generate errors, experience increased wear or shortened lifespan, produce excessive waste heat, cost more to operate, or suffer a catastrophic failure.

The operating temperature of such a component may be related to the workload allocated to that component or to factors related to that component's operating environment.

BRIEF SUMMARY

A first embodiment of the present invention provides a method for balancing workloads of a plurality of components of a multi-component power-consuming system, said method comprising:

a processor of a computer system receiving a plurality of values from a plurality of continually updated environmental sensors;

said processor receiving a task request;

said processor selecting a balanced workload allocation of at least two components of said plurality of components as a function of a plurality of factors, wherein said plurality of factors comprise said plurality of values; and said processor communicating said balanced workload allocation and said task request to a routing mechanism, wherein said routing mechanism distributes said task request to at least one component of said plurality of components.

A second embodiment of the present invention provides a computer program product, comprising a computer-readable hardware device having a computer readable program code stored therein, said computer readable program code comprising a method for balancing workloads of a plurality of components of a multi-component power-consuming system, said method implemented by execution of program code on a processor of a computer system, said method comprising:

said processor receiving a plurality of values from a plurality of continually updated environmental sensors;

said processor receiving a task request;

said processor selecting a balanced workload allocation of at least two components of said plurality of components as a function of a plurality of factors, wherein said plurality of factors comprise said plurality of values; and said processor communicating said balanced workload allocation and said task request to a routing mechanism, wherein said routing mechanism distributes said task request to at least one component of said plurality of components.

A third embodiment of the present invention provides a computer system comprising a processor, a memory coupled to the processor, and a computer readable hardware storage device coupled to said processor, said storage device containing program code configured to be executed by the processor via the memory to implement a method for balancing workloads of a plurality of components of a multi-component power-consuming system, said method comprising:

said processor receiving a plurality of values from a plurality of continually updated environmental sensors;

said processor receiving a task request;

said processor selecting a balanced workload allocation of at least two components of said plurality of components as a function of a plurality of factors, wherein said plurality of factors comprise said plurality of values; and said processor communicating said balanced workload allocation and said task request to a routing mechanism, wherein said routing mechanism distributes said task request to at least one component of said plurality of components.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with the computing system is configured to perform a method for balancing workloads of a plurality of components of a multi-component power-consuming system, said method implemented by execution of program code on a processor of a computer system, said method comprising:

said processor receiving a plurality of values from a plurality of continually updated environmental sensors;

said processor receiving a task request;

said processor selecting a balanced workload allocation of at least two components of said plurality of components as a function of a plurality of factors, wherein said plurality of factors comprise said plurality of values; and said processor communicating said balanced workload allocation and said task request to a routing mechanism, wherein said routing mechanism distributes said task request to at least one component of said plurality of components.

DETAILED DESCRIPTION

Figure 1:
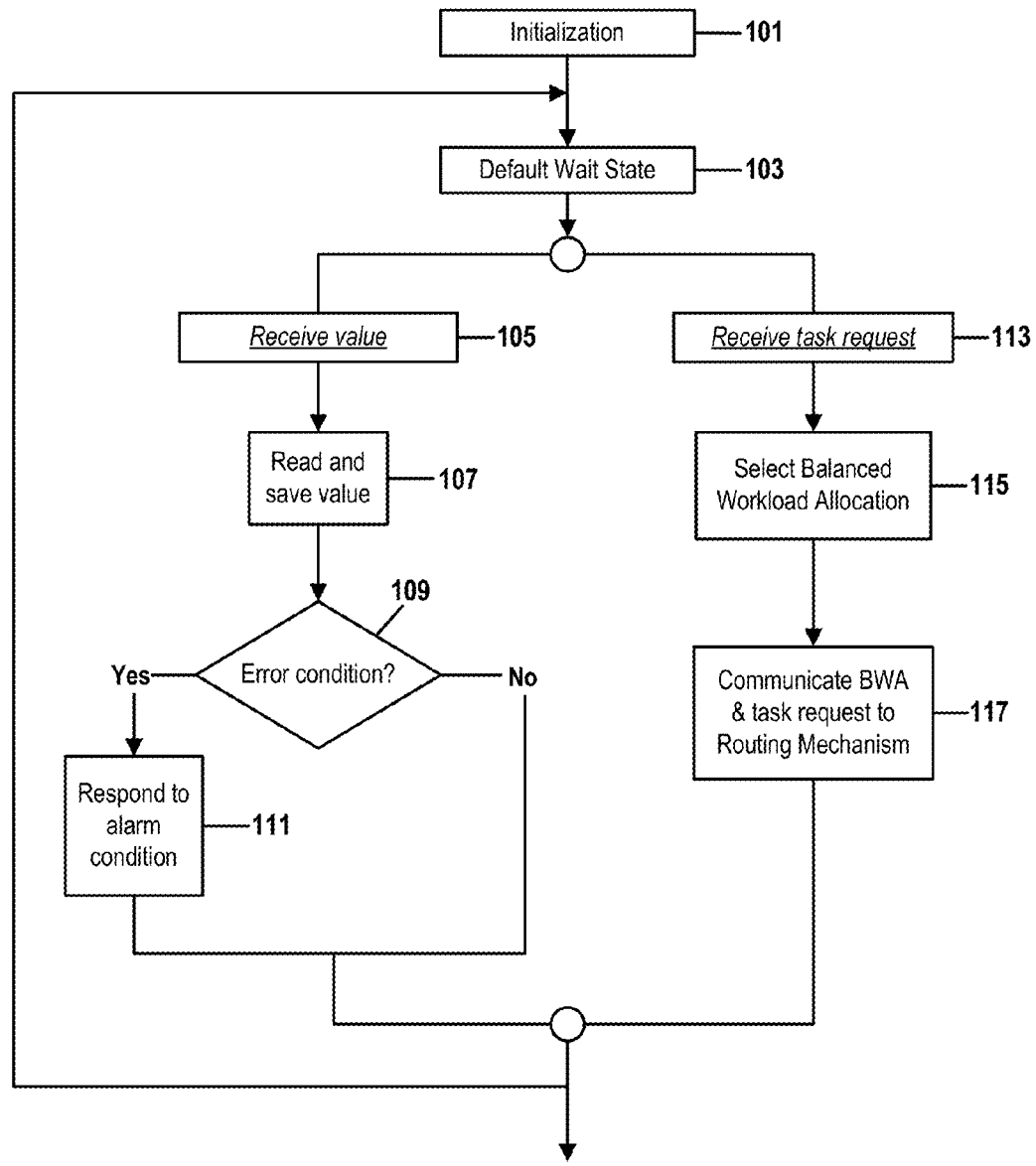
FIG. 1 is a flow chart illustrating steps of a method for load-balancing the components of a multi-component power-consuming system, in accordance with embodiments of the present invention.

Embodiments of the present invention provide a method, computer program product, computer system, and process for environmentally aware load-balancing the components of a power-consuming system.

A load-balancer applies task-allocation criteria to determine how to allocate tasks among the components of a multi-component system and communicates task-allocation decisions to a routing mechanism that distributes tasks to the components.

Current load-balancers may employ task-allocation criteria that strive to route the same number of tasks to each component of a group of similar components. A group of similar components might consist of all the hard drives in a storage array, all the video servers in a video-on-demand server farm, or all the generators in a power-generating facility.

This class of task-allocation criteria is commonly implemented as a simple "round-robin" task-allocation algorithm that allocates new tasks to components within a group in circular order, allocating each task to a component that has gone longer without receiving a task than any other member of that component's group.

More sophisticated task-allocation algorithms that serve equipment like Web server farms or content-delivery systems, may also consider some indicator of processor loading that can be monitored through operating-system or network-management tools. Such algorithms may, for example, allocate tasks to components that report lower CPU utilization or that have access to greater amounts of available resources, such as RAM or disk storage.

None of these approaches, however, give load-balancers the ability to monitor and react to environmental metrics. They cannot, for example, determine that a temperature-sensitive component is running too hot or that the power consumption, ambient temperature, or humidity of one room of a power plant is about to exceed safe limits. Because such potentially dangerous conditions can be triggered by variations in task symmetry or environmental conditions, a component may overheat even when that component has neither processed a greater number of tasks nor consumed a greater number of resources than the component's peers. For this reason, the environmentally insensitive load-balancers described above are unable to address these types of problems. They may, in fact, drive an overheating component to failure if that component satisfies the criteria of the load-balancer's task-allocation algorithm.

When a power-consuming system comprises temperature-sensitive components like computers, optical storage units, electric motors, or internal-combustion engines, overheating can affect a component's efficiency, increase error rates, accelerate wear or shorten component lifespan, produce excessive waste heat, increase operating and cooling costs, or even lead to catastrophic failure. In tightly coupled limited-redundancy systems like multiprocessor computers, "last-mile" power-distribution grids, or non-mirrored RAID disk arrays, the ripple effects of a single compromised component can impact the performance of the entire system.

The problem is made more complex by the fact that component operating temperature is not an independent variable. Merely monitoring the temperature of a single critical component cannot generally avert a system shutdown. Computer motherboards that abruptly turn power off when the temperature of a CPU chip exceeds a threshold do not prevent system failure. At best, they initiate a preemptive failure that shuts down the entire system before an overheated component can suffer damage. They cannot interpret and intelligently respond to a rising temperature before a component reaches a point of failure or compromised performance.

Nor can such load-balancers consider external factors when interpreting operating temperature measurements. Environmental data, such as the ambient temperature of a component's operating environment, or the temperature of adjacent zones in the same room, can suggest different responses to a rising component temperature. In a multi-site distributed system, the decision to route a task to a particular facility can be at least partly dependent upon environmental and non-environmental factors at each site, such as local ambient temperatures, relative cooling capacities, energy and cooling costs, differences in power consumption, resource availability, the age and condition of each component, or even local time zone and staffing levels.

The round-robin task-allocation algorithms and simple temperature-related emergency-shutdown alarms of current load-balancers thus cannot effectively manage multi-component power-consuming systems to optimize parameters like component lifespan, operating efficiency, reliability, and cost.

Embodiments of the present invention address these problems with a load-balancer for a multi-component power-consuming system that receives continually updated data from environmental sensors. When a task request arrives, the load-balancer's task-allocation algorithm selects a balanced workload allocation that allocates the incoming task as a function of values received from environmental sensors. The load-balancer then communicates the selected balanced workload allocation and the task request to a routing mechanism, which forwards the task request to one or more components.

In one embodiment, the task-allocation algorithm also considers at least one environmentally insensitive factor, at least one of which may be received from continually updated non-environmental sensors. In this embodiment, the values of one or more environmentally insensitive factors may alter how the task-allocation algorithm interprets and responds to one or more values received from environmental sensors.

In yet another embodiment, the multi-component system is a computer system, wherein components may comprise distinct computers of a distributed system, sub-components of computer systems in a single- or multi-computer system, or components or sub-components that are shared by computers in a multi-computer system.

In another embodiment, when the multi-component computer system includes components located at a plurality of sites, an environmentally aware load-balancer may allocate tasks among the different sites or among components located at different sites.

FIG. 1 is a flow chart illustrating steps of a method for environmentally aware load-balancing the components of a multi-component power-consuming system, in accordance with embodiments of the present invention. FIG. 1 depicts steps 101-117.

In initialization step 101, an environmentally aware load-balancer is loaded with a task-allocation algorithm. This step may also include populating an environmental data table with initializing values of at least one environmentally sensitive metric. This table may be implemented as a physically distinct table of data on a computer-readable storage device, as data stored in computer memory, as a human-readable electronic or non-electronic document, or as any other type of information recorded on a readable, updatable medium.

The environmentally sensitive factors stored in the environmental data table may include, but are not limited to, a component's idle or operating temperature, component power draw, waste-heat production, the ambient temperature or humidity of a geographically distinct site (or of a zone within a site) within which a component is located, and the power consumption or temperature of an environmental-regulation device, such as a humidifier, dehumidifier, blower, or cooling unit. In an embodiment, at least one of these environmental sensors may each monitor a subsystem that comprises a combination of components, environmental-regulation devices, or both.

The values stored in the environmental data table are continually updated with values received by the load-balancer from at least two environmental sensors that monitor environmental parameters related to the power-consuming system or the environment within which components of that system are located. In an embodiment, one or more of the initializing values are also received from environmental sensors, but in other embodiments, these initializing values might be defined and loaded into the environmental data table through other means, such as being copied from a set of default values stored in computer memory or on a computer-readable or human-readable information-storage medium.

In an embodiment, initialization may also include the act of populating a support table with initializing values of at least one environmentally insensitive factor. A support table may be implemented as a physically distinct table of data on a computer-readable storage device, as data stored in computer memory, as a human-readable electronic or non-electronic document, or as any other type of information recorded on a readable, updatable medium.

The environmentally insensitive factors stored in a support table may include, but are not limited to: a component processor's CPU utilization, the number of tasks currently being handled by a component, and a component's resource availability (such as the amount of a processor's unused RAM, an engine's fuel level, or available space on a hard drive).

Some of the values stored in a support table may relate to factors that are not updated during the normal operation of the load-balancer. These may include, but are not limited to: the estimated or non-estimated unit costs to cool, humidify, or dehumidify a geographically distinct site (or a zone within that site); the estimated or non-estimated unit costs of electrical power or fuel at a geographically distinct site (or a zone within that site); safe or error ranges of one or more factors; a component's, sensor's or other entity's estimated lifespan and manufacture, installation, or power-on date; and critical emergency-shutdown values of an environmental metric or environmentally insensitive factor.

In other embodiments, the support table may store other types of data not updated by environmental sensors. These other types of data may, for example, identify the location of entities that include, but are not limited to: components, sensors, environmental-regulation devices, sites wherein components, sensors, or other entities are located, and zones within those sites.

The values contained in a support table may be manually entered, loaded from a storage medium, or received electronically from other sources, but unlike the contents of the environmental data table, are not received from environmentally sensitive sensors that monitor environmental parameters related to the power-consuming system or the environments within which components of that system are located. One or more support table values may be continually updated by any means other than by receiving data from such environmentally sensitive sensors. When load-balancing a networked computer system, for example, a processor's CPU-utilization figures might be received via a computer network through a network interface that may be integrated into the load-balancer.

In an embodiment, any value stored in the environmental data table or the support table may be assigned a weighting and those weightings may also be stored in the environmental data table, the support table, or both. These weightings may be constants, variables, or functions and may be updatable by the task-allocation algorithm.

In step 103, upon completion of initialization, the load-balancer enters a default wait state, wherein the load-balancer waits to: i) receive one or more environmentally sensitive values in step 105; or ii) receive a new task request in step 113.

In step 105, a load-balancer in a default state receives one or more environmentally sensitive values from environmental sensors. In embodiments wherein values stored in a support table are capable of being continually updated, the load-balancer may receive one or more support table values in this step.

In step 107, if a value is received in step 105, the load-balancer determines whether that value indicates an error condition, such as an over-temperature warning, low storage capacity, a high ambient humidity level, or an emergency-shutdown state. The load-balancer may make this determination as a function of considerations that might include task-allocation algorithm rules, values received from sensors, and values stored in the support table.

Step 109 determines whether an error condition exists. If step 109 determines that an error condition exists, then, in step 111, embodiments of an environmentally aware load-balancer may take some action in response to the error condition. This action may involve notifying appropriate personnel, directing workers or systems to take specific steps, shutting down one or more components, routing incoming tasks away from certain components, or other actions that may include total shutdown of the power-consuming system or initiation of a different task-allocation algorithm.

Upon completion of step 111, or if step 109 determines that no error condition exists, if the load-balancer is able to resume normal operation, the load-balancer returns to a default wait state (step 103).

In step 113, the load-balancer in a default wait state (step 103) receives a new task request.

In step 115, the task-allocation algorithm selects a balanced workload allocation that will allocate the task request to one or more components. The task-allocation algorithm may base this specification upon the most-recently received environmentally sensitive values and on the values currently stored in any existing support table.

In step 117, this balanced workload allocation is communicated to a routing mechanism that directs the incoming task request to the component or components specified by the balanced workload allocation.

Upon completion of step 117, the load-balancer returns to a default wait state (step 103).

The environmentally aware load-balancer illustrated in FIG. 1 does not limit the present invention to embodiments wherein the load-balancer in a default wait state simply responds to all incoming values and task requests in the order in which they arrive. Other embodiments may perform either of these steps at scheduled or computed times that may be implementation-dependent or may be a function of one or more previously received values. In another embodiment, the load-balancer actively polls or requests values at times that are computed as a function of previously received values or of trends or rates of change of previously received values.

Figure 2:
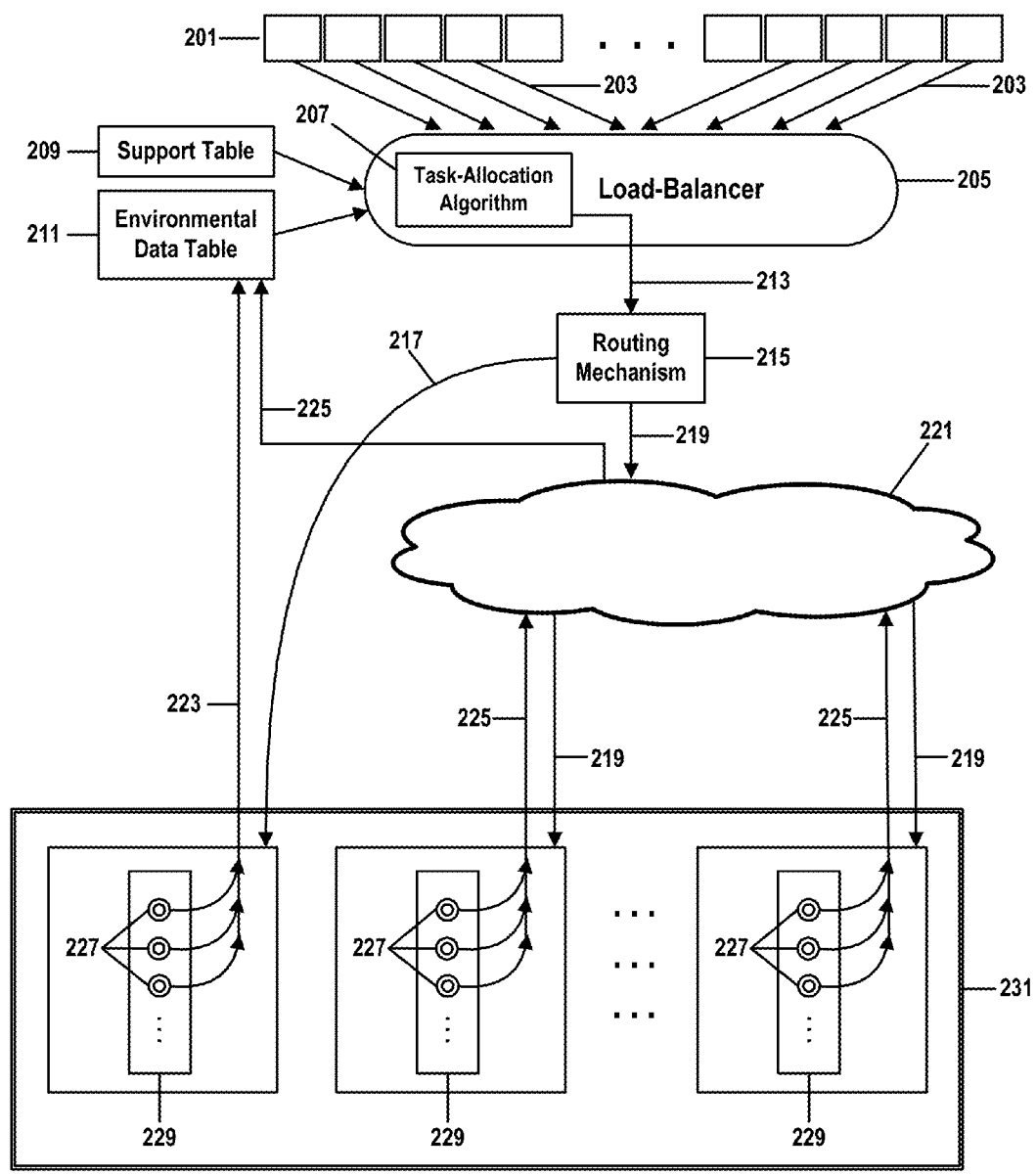
FIG. 2 shows the high-level structure of an environmentally aware load-balancer and the multi-component power-consuming system that the load-balancer serves, in accordance with embodiments of the present invention.

FIG. 2 shows the high-level structure of an environmentally aware load-balancer and the multi-component power-consuming system that the load-balancer serves, in accordance with embodiments of the present invention. In this embodiment, an environmentally aware load-balancer 205 receives task requests 203 from a variety of client sources 201. These sources may be electronic devices, mechanical equipment, human users, communications or networking devices, or any other entity or combinations of entities that may request services from components 229 of power-consuming system 231.

Task requests 203 may be received by load-balancer 205 through electronic, mechanical, handwritten, or any other means of communication. These means may include activities of a human operator or external system that translate a task request into a form that can be understood by the load-balancer or that submit such a request to the load-balancer in such a form.

The load-balancer 205 responds to each task request 203 by selecting a balanced workload allocation that allocates the requested task to at least one component of power-consuming system 231. The task-allocation algorithm 207 selects this balanced workload allocation for the load-balancer as a function of values stored in one or more environmental data tables 211. The load-balancer then communicates the incoming task request and balanced workload allocation 213 to a routing mechanism 215.

In another embodiment, task-allocation algorithm 207 selects a balanced workload allocation as a function of one or more values stored both in one or more environmental data tables 211 and in one or more support tables 209. As described in detail in step 101 of FIG. 1, support tables 209 store environmentally insensitive factors that may be used by embodiments of the load-balancer to select a balanced workload allocation.

The routing mechanism 215 uses the balanced workload allocation to determine which system component or components should receive the incoming task request. The routing mechanism then allocates the requested task 217 to one or more appropriate components 229 of power-consuming system 231.

In an embodiment, at least some components of power-consuming system 231 located at one or more remote sites communicate with routing mechanism 215 by exchanging networked communications 219 through one or more networks 221. These networked communications may include task requests forwarded from the load-balancer to the routing mechanism.

In another embodiment, not shown in FIG. 2, the load-balancer may communicate with multiple routing mechanisms, each of which allocate tasks to components of the power-consuming system, and each of which may communicate with the load-balancer, at least one of the power-consuming system components, or both, through a network.

The values stored in environmental data table 211 are continually updated by measurements 223 received from environmental sensors 227, which monitor characteristics of at least two components 229 of power-consuming system 231. Each sensor may monitor more than one component or subsystem (each of which may comprise multiple components) and each component may be monitored by more than one sensor. In an embodiment, redundant sensors allow the load-balancer to function even when one sensor has failed.

In an embodiment, at least one environmental sensor 227 monitors environmental metrics of the environments within which the power-consuming system operates. These metrics may include but are not limited to, a site's ambient temperature and humidity or the ambient temperature in areas adjacent to a system site.

In an embodiment not shown in FIG. 2, some or all of sensors 227 are polled by a sensor interface that reads sensor values, performs any required post-processing on the read values, and transmits those processed values in a format that allows those values to be successfully received by the load-balancer through a direct physical connection, computer network, telecommunications interface, human-readable document, or other communications medium.

Values read by environmental sensors 227 may be forwarded directly to one or more environmental data tables 211 through a direct connection 223 or via networked connections 225. In embodiments, these connections can take the form of electronic signals, manual entry, or any other information-communication mechanism. In other embodiments, sensor values 223 and 225 are communicated to the load-balancer, which may store those values in one or more environmental data tables embedded within the load-balancer or maintained on an external medium.

Figure 3:
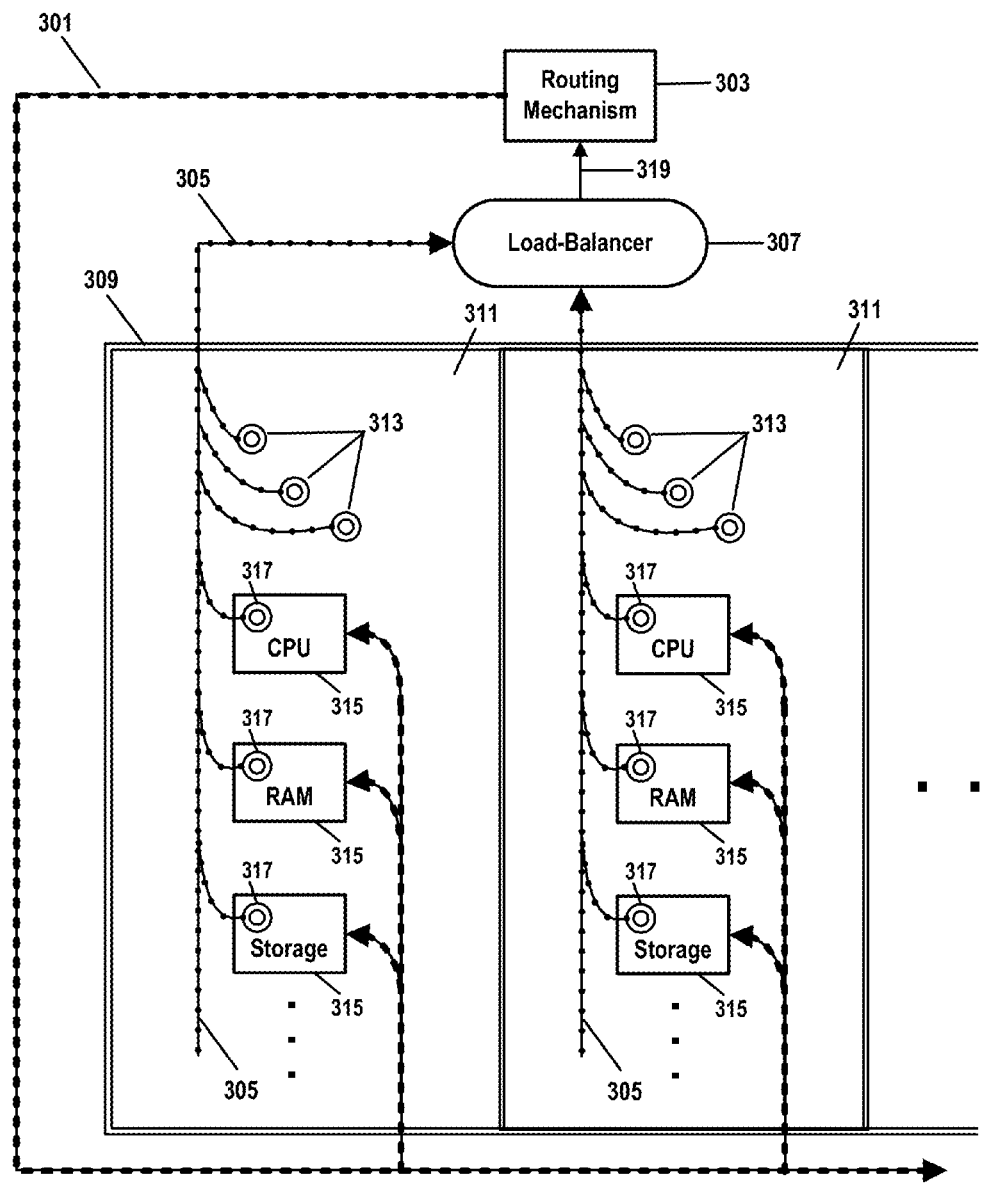
FIG. 3 shows an expanded view of the power-consuming system of FIG. 2, in accordance with embodiments of the present invention.

FIG. 3 shows a more detailed view of the power-consuming system 231 of FIG. 2, wherein power-consuming system 309 communicates with an environmentally aware load-balancer 307 and a routing mechanism 303. This particular embodiment is shown for illustrative purposes and is not meant to limit the forms of power-consuming systems that may be served by embodiments of the present invention.

In this embodiment, components 315 of the power-consuming system are distributed across multiple sites 311. Components may include the computer equipment, other types of electronic devices, electric motors, engines, other types of electrical or mechanical devices, or any other entities that consume power during their normal operation. Not all components of the power-consuming systems embodied in the present invention will themselves be power-consuming.

The power consumed by the power-consuming system can be derived from any type of electrical, electromechanical, internal combustion, chemical, phase-change, radiative, radioactive, or other power-producing means. In other embodiments, one or more of a load-balancer 307, one or more routing mechanisms 303, and one or more components 315 may communicate through a computer network or telecommunications infrastructure.

Environmental sensors 317 may be configured so as to monitor a component's operating temperature, heat-production, power-consumption, or other environmental metrics. A single sensor may monitor multiple components or a multi-component subsystem and multiple sensors may monitor the same component or multi-component subsystem.

In an embodiment, other environmental sensors 313 may be configured to monitor similar types of environmental metrics that are not directly related to the states of individual components. Such environmental sensors may, for example, monitor the ambient temperature of a room that houses one or more components, the level of fuel reserves available to components located at a particular site, or the power consumption of a cooling device.

The load-balancer 307 may receive values 305 from environmental sensors 313 or 317 via any sort of direct physical, networked, manual, or other communications mechanism. Those values are then used to select a balanced workload allocation, as described above and in FIG. 2. In some embodiments, a balanced workload allocation is selected as a function of both values received from the environmental sensors and of values stored in a support table (shown in FIG. 2).

When load-balancer 307 receives a task request, the load-balancer forwards that request, along with a balanced workload allocation 319 to one or more routing mechanisms 303. The load-balancer and the routing mechanisms may be connected through any sort of direct physical, networked, manual, or other communications mechanism.

One or more of the routing mechanisms 303 then distribute the forwarded task request 301 to one or more components 315, using the information that the routing mechanism received from load-balancer 307 to select components to receive the request. Routing mechanisms may communicate with components through any sort of direct physical, networked, manual, or other communications mechanism.

Figure 4:
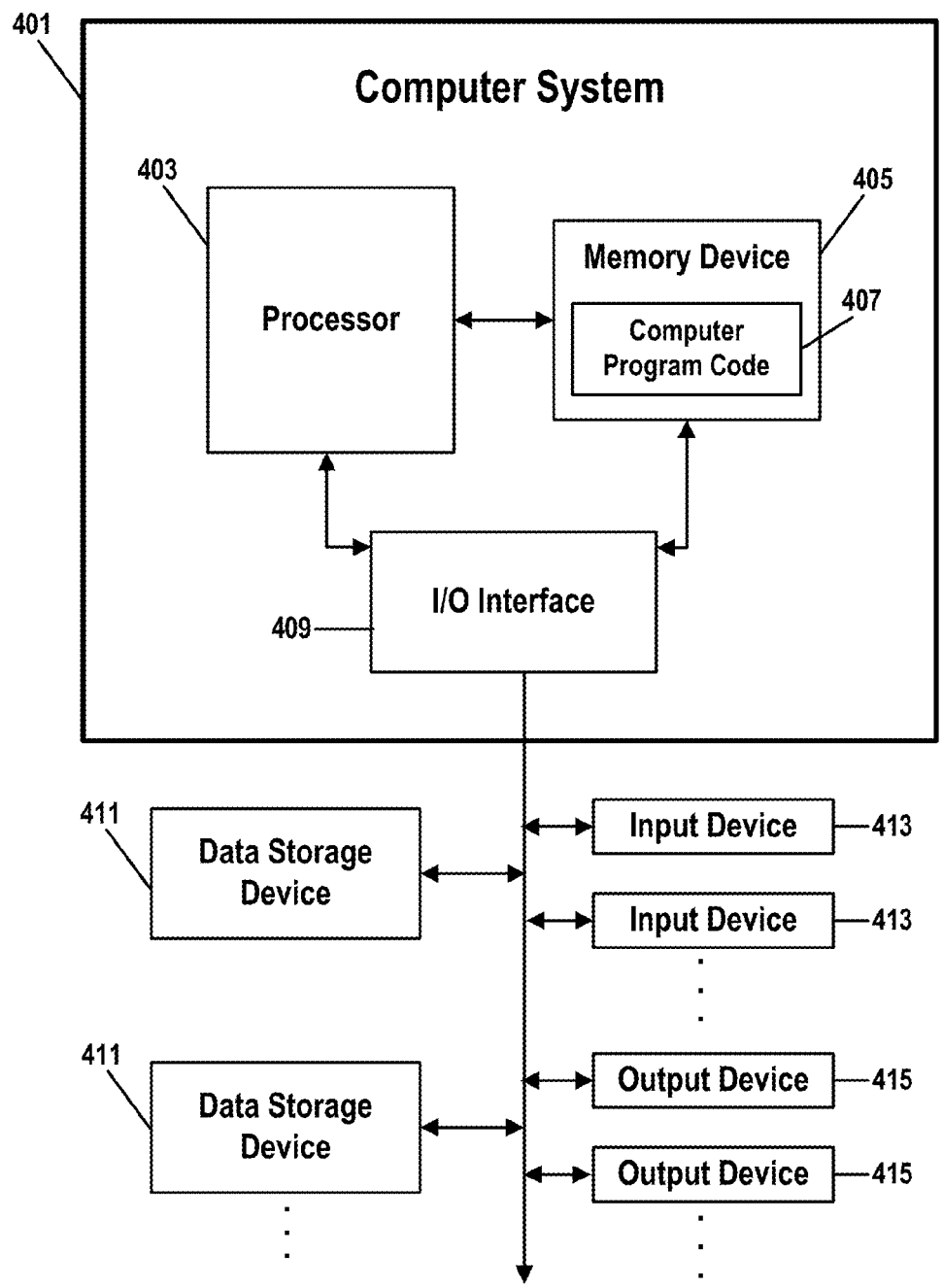
FIG. 4 shows the structure of a computer system used for environmentally aware load-balancing the components of a multi-component power-consuming system, in accordance with embodiments of the present invention.

FIG. 4 shows the structure of a computer system and computer program code that may be used for environmentally aware load-balancing the components of a multi-component power-consuming system, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code which implement methods of the present invention do not comprise a signal generally, or a transitory signal in particular.

Any combination of one or more computer-readable medium(s) or devices may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIG. 1 and FIG. 6 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

In FIG. 4, computer system 401 comprises a processor 403 coupled through one or more I/O Interfaces 409 to one or more hardware data storage devices 411 and one or more I/O devices 413 and 415.

Hardware data storage devices 411 may include, but are not limited to, magnetic tape drives, fixed or removable hard disks, optical discs, and solid-state random-access or read-only storage devices. I/O devices may comprise, but are not limited to, input devices 413, such as a keyboard, scanner, handheld device, touch-sensitive displays, biometric joystick, or mouse, and output devices 415, which may include printers, plotters, tablets, mobile devices, or computer displays. Data storage devices 411, input devices 413, and output devices 415 may be located either locally or at remote sites from which they are connected to I/O Interface 409 through a network interface.

Processor 403 is also connected to one or more memory devices 405, which may include, but are not limited to, Dynamic RAM (DRAM), Static RAM (SRAM), Programmable Read-Only Memory (PROM), Field-Programmable Gate Arrays (FPGA), or other types of memory devices.

At least one memory device 405 contains stored computer program code 407, which is a computer program that comprises computer-executable instructions. The stored computer program code includes a program that implements environmentally aware load-balancing for a power-consuming system, in accordance with embodiments of the present invention and may implement other embodiments described in this specification, including the methods illustrated in FIG. 1 AND FIG. 6. The data storage devices 411 may store the computer program code 407. Computer program code 407 stored in the storage devices 411 is configured to be executed by processor 403 via the memory devices 405. Processor 403 executes the stored computer program code 407.

Thus the present invention discloses a process for supporting computer infrastructure, integrating, hosting, maintaining, and deploying computer-readable code into the computer system 401, wherein the code in combination with the computer system 401 is capable of performing a method for environmentally load-balancing the components of a power-consuming system.

Any of the components of the present invention could be created, integrated, hosted, maintained, deployed, managed, serviced, supported, etc. by a service provider who offers to facilitate environmentally load-balancing the components of a power-consuming system. Thus the present invention discloses a process for deploying or integrating computing infrastructure, comprising integrating computer-readable code into the computer system 401, wherein the code in combination with the computer system 401 is capable of performing a method for environmentally load-balancing the components of a power-consuming system.

One or more data storage units 411 (or one or more additional memory devices not shown in FIG. 4) may be used as a computer-readable hardware storage device having a computer-readable program embodied therein and/or having other data stored therein, wherein the computer-readable program comprises stored computer program code 407. Generally, a computer program product (or, alternatively, an article of manufacture) of Computer System 401 may comprise said computer-readable hardware storage device.

Figure 5:
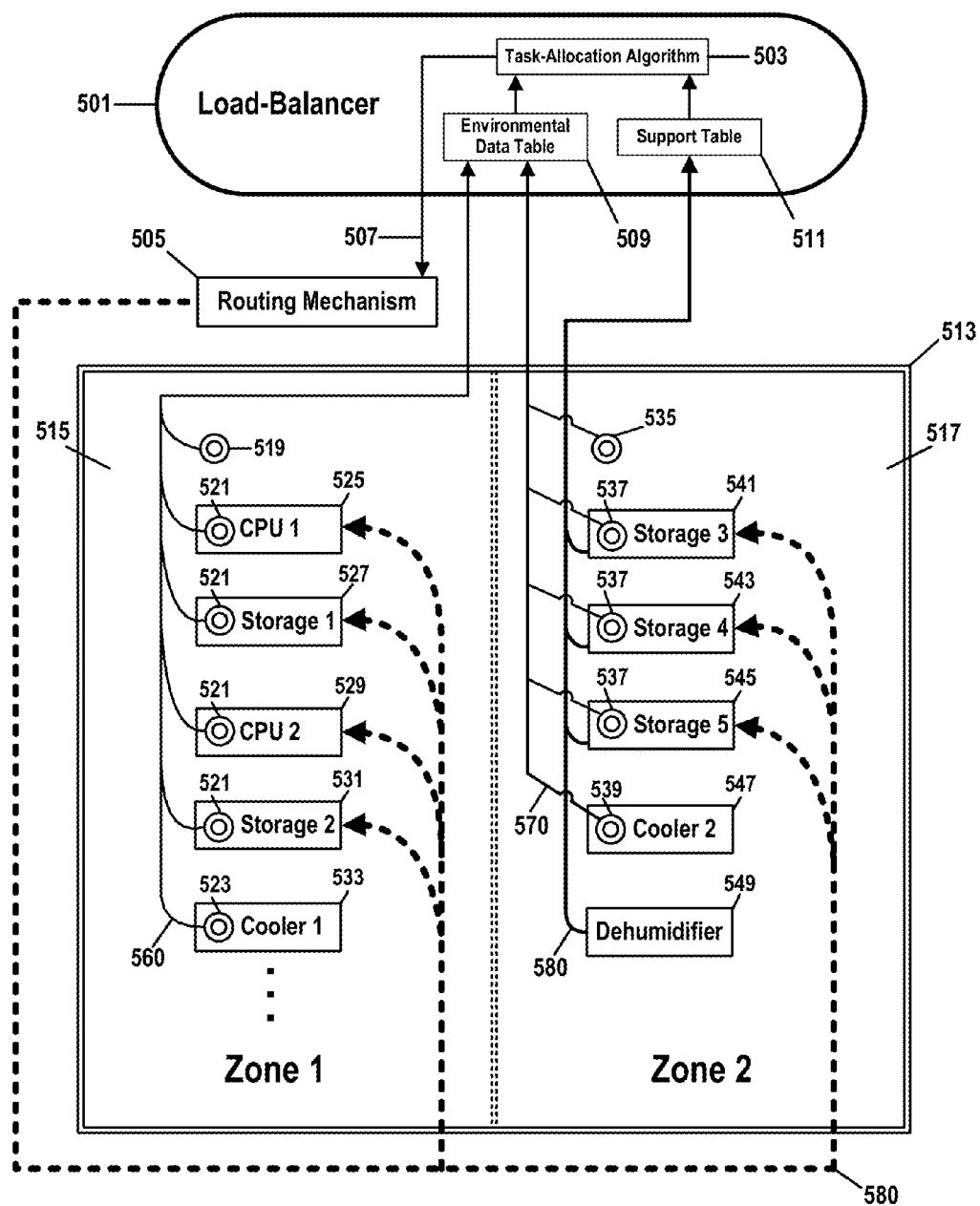
FIG. 5 shows an environmentally aware load-balancer that balances the components of a power-consuming computer system distributed across at least two zones of at least one data center, in accordance with embodiments of the present invention.

FIG. 5 shows an environmentally aware load-balancer 501 that balances the components of a power-consuming computer system distributed across at least two zones 515 and 517 of at least one data center 513, in accordance with embodiments of the present invention.

FIG. 5 shows temperature-monitoring environmental sensors 521 affixed to four components 525-531 of the power-consuming system that are located in zone 1 515: CPU 1 (525), storage unit 1 (527), CPU 2 (529), and storage unit 2 (531). Zone 1 may contain other power-consuming or non-power-consuming components of the power-consuming system not shown in FIG. 5.

Zone 1 515 also contains environmental sensor 519, which monitors ambient air temperature in zone 1. Environmental sensor 523 monitors the power-consumption rate of cooler 1 (533), which may be an air-conditioning unit or other device intended to regulate the ambient air temperature in zone 1.

In this embodiment, load-balancer 501 receives values 560 from environmental sensors 519-523 and stores those values in an environmental data table 509 maintained in the load-balancer's internal memory. In embodiments not shown in the figure, one or more environmental data tables may be stored in some other information-storage medium.

Zone 2 517 contains a storage farm of storage modules (such as floppy or hard disk drives, solid-state drives, or optical media) that includes storage units 3-5 (541-545). An environmental sensor 537 affixed to each storage module monitors that module's operating temperature.

Zone 2 517 also contains multi-function environmental sensor 535, which monitors air temperature and humidity in zone 2. Environmental sensor 539 monitors the power-consumption rate of cooler 2 (547), which, like cooler 1 533, is intended to regulate the ambient air temperature in the cooler's local zone.

In this embodiment, load-balancer 501 receives environmental values 570 from sensors 535-539 and stores those values in environmental data table 509.

In this embodiment, environmentally insensitive values are stored in a support table 511 maintained in load-balancer 501's internal memory. In other embodiments not shown in the figure, some or all of these values or other environmentally insensitive values may be stored in some other information-storage medium.

Some of these environmentally insensitive values are capable of being continually updated by a variety of means. In FIG. 5, storage units 3-5 (541-545) electronically transmit data 580 that tracks their respective amounts of available storage and which is stored in support table 511. Similarly, dehumidifier 549 electronically transmits reservoir water-level data, which is stored in the support table, that indicates how soon the dehumidifier will need to be taken off-line for maintenance.

In this embodiment, when load-balancer 501 receives a task request, task-allocation algorithm 503 selects a balanced workload allocation 507 as a function of, inter alia, the values stored in environmental data table 509 and support table 511. Balanced workload allocation 507 is communicated to routing mechanism 505, which uses this information to allocate task 580 to the component or components identified by balanced workload allocation 507.

Figure 6:
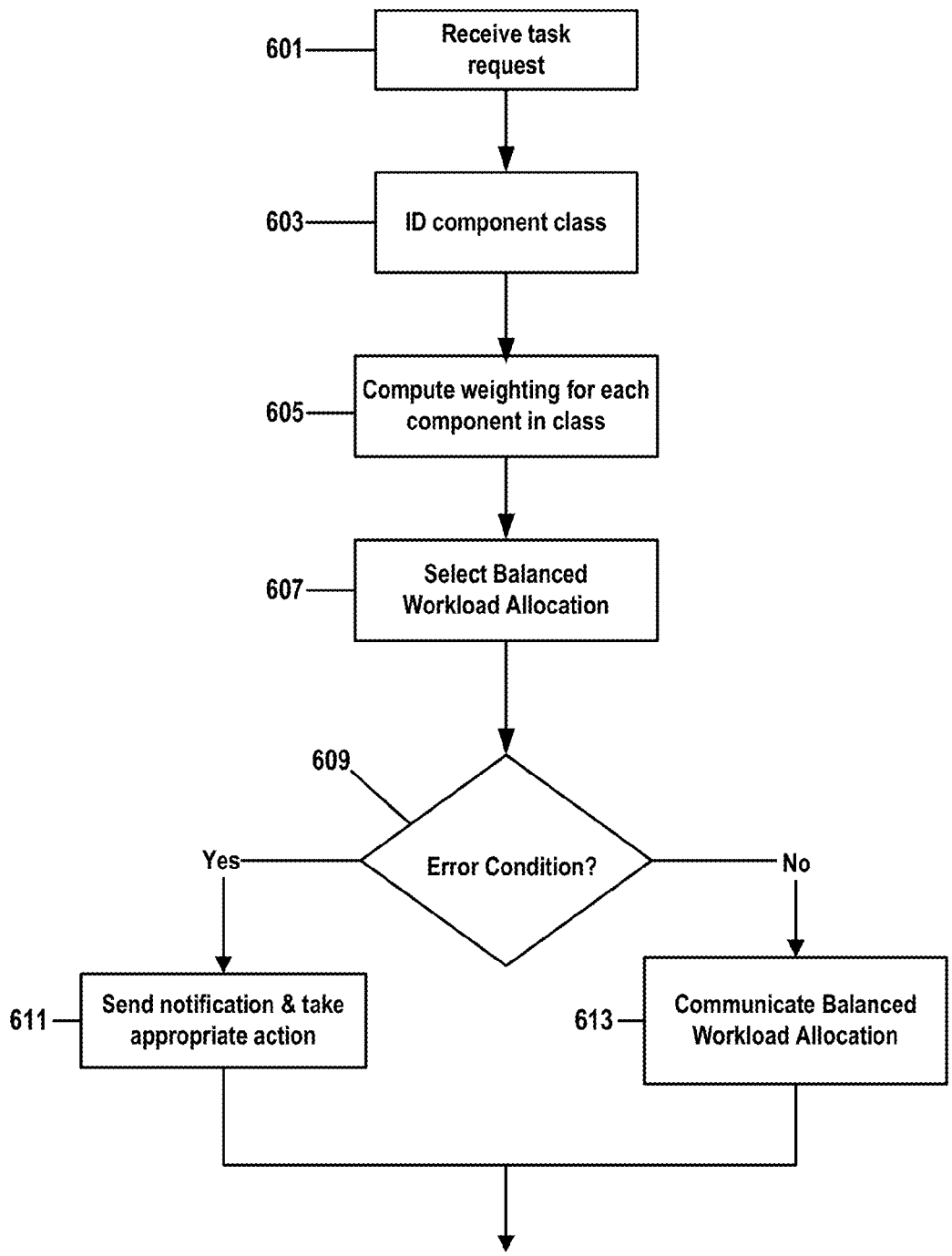
FIG. 6 is a flow chart that illustrates a class of task-allocation algorithms that might be implemented in the environmentally aware load-balancer of FIG. 5, in accordance with embodiments of the present invention.

FIG. 6 is a flow chart that illustrates a class of task-allocation algorithms that might be implemented in the environmentally aware load-balancer of FIG. 5, in accordance with embodiments of the present invention. FIG. 6 depicts steps 601-613.

Task-allocation algorithms can take many forms, and are their internal steps generally depend on factors that include, but are not limited to, the detailed makeup of the multi-component power-consuming system, the configuration of environmental sensors, the goals of the system designers and users, and the data stored in environmental data tables 509 and support tables 511 (as shown in FIG. 5). Other task-allocation algorithms embodiments not shown in FIG. 6, for example, may execute some of the steps of FIG. 6 in different order, may combine or eliminate some steps, or may add additional steps. In some cases, the resulting task-allocation algorithm may be very different from the embodiment of FIG. 6.

One defining characteristic of all embodiments of the present invention, however, is a task-allocation algorithm capable of selecting a balanced workload allocation as a function of, inter alia, values received from at least two continually updated environmental sensors. In some embodiments, a task-allocation algorithm may further base a balanced workload allocation selection on other factors, possibly including at least one value stored in one or more support tables 511.

In step 601 of FIG. 6, an embodiment of the environmentally aware load-balancer 501 (shown in FIG. 5) launches task-allocation algorithm 503 when the load-balancer receives a task request.

In step 603, the task-allocation algorithm may first respond by identifying one or more classes or groups of components that are candidates to receive the requested task. Such classes of components may be organized to each contain similar types of components or subsystems. These types may include, but are not limited to, processors, data-storage devices, audio-visual content-storage optical drives, internal-combustion engines, electric motors, or heating/cooling units.

A class may be divided into sub-classes, wherein the components of each sub-class have one or more common characteristics. A class of processors, for example, may comprise sub-classes based on each component processor's mission-criticality, physical location, age, connectivity, or architecture, or on the quantity, location, or classes of peripherals available to that component processor. In embodiments that include step 603, some task-allocation algorithms, when allocating a task, will consider only components that are contained in identified candidate classes.

In step 605, a task-allocation algorithm might quantize and compare the benefits and disadvantages of allocating the incoming task to one or more candidate components. In some embodiments, this step may comprise computing an allocation weighting Wt for each candidate component. These weightings may be constants, variables, functions, or any other type of computational entity and may be calculated as functions of at least one value of at least one environmental metric stored in one or more environmental data tables 509.

Each candidate component's weighting may also be a function of other variables, constants, or functions, at least one of which may be stored in one or more support tables 511, and at least one of which may be an environmental or nonenvironmental value related to the states of some other components or related entities. If, for example, a task arrives that would be performed by a CPU, the task-allocation algorithm might consider, in addition to each candidate CPU's operating temperature, the temperature of that CPU's local RAM or hard drive or the ambient temperature in the CPU's cabinet or rack, in the CPU's climate-controlled data center, or in the environment outside the CPU's data center.

In some embodiments, these additional computations may alter the balanced workload allocation 507 ultimately selected by the load-balancer. When, for example, choosing one computer from among all candidates, if consideration of environmental values produces a tie, a task-allocation algorithm may consider tie-breaking factors like available network bandwidth, CPU utilization, or component age.

One embodiment of steps 605 and 607, which compute component allocation weightings and select a balanced workload allocation, might implement rules of the general form:

```
010     FOR Class =1 TO #Classes
020        FOR Comp =1 TO #Comps_Class
030           Wt_{Comp.Class} = f_{wt.Comp.Class} (p_1, p_2, p_3, ... )
040        NEXT Comp
050     Optimal_{Class} = f_{opt.Class} (Wt_{1.Class}, Wt_{2.Class}, ... Wt_{N.Class})
060     NEXT Class
070  Optimal_{System} = f_{opt.System} (Optimal_1, Optimal_2, ... Optimal_X)
```

Here, the load-balancer serves a power-consuming system that comprises components organized into the number of component classes Class that is equal to the numeric value #Classes. Each component class Class comprises the number of components that is equal to the numeric value $\#Comps_{Class}$.

The loop of lines 020-040 computes an allocation weighting $Wt_{Comp.Class}$ for each component Comp of class Class. The form of functions $f_{wt.Comp.Class}$ (line 030), each instance of which computes $Wt_{Comp.Class}$ for one component Comp, is implementation-dependent and may be determined by considerations that include, but are not limited to, the exact configuration of the power-consuming system and the goals of the system designers.

Embodiments may use a single instance of function $f_{wt.Comp.Class}$ to compute weightings for some or all components, may define different functions for different components, subsystems, or classes or sub-classes of components, or may vary $f_{wt.Comp.Class}$ when certain conditions are satisfied. Embodiments of $f_{wt.Comp.Class}$ may be functions of any number of parameters $p_n$, which may comprise any constant, function, received value, environmentally sensitive value, nonenvironmentally sensitive factor, or other computational entity used by the load-balancer to decide how to allocate tasks. In all embodiments that include such computations, each component's resultant weighting is related in some way to the component's relative ability to perform the incoming task or to the relative desirability of routing that task to each component.

In some embodiments or only under certain conditions in other embodiments, at least one component may receive a weighting in step 605 that is not a function of received environmental values. But even in such cases, the environmentally aware load-balancer's overall task-allocation selection is dependent in some way upon at least two values received from environmental sensors, even if the system has merely used those values to confirm that no further environmentally sensitive analysis is required.

In some embodiments or only under certain conditions in other embodiments, the computation of $f_{wt.Comp.Class}$ may be trivial, may be performed for only a subset of candidate components, may be omitted, or may be replaced by other algorithmic steps.

In line 050, some embodiments of a task-allocation algorithm might select an optimal component $Optimal_{Class}$, where that selected component is a member of class Class, as a function $f_{opt.Class}$ of one or more allocation weightings $Wt_{Comp.Class}$.

In other embodiments, the algorithm may have the ability to choose multiple optimal components or subsystems in this manner. In other embodiments, the algorithm may select an optimal component or components by considering allocation weightings of components in more than one class or sub-class of components. In some embodiments or only under certain conditions in other embodiments, one or more of these computations may be trivial, may be performed for only a subset of candidate components, may not be performed, or may be replaced by different algorithmic steps.

The optimal class-component selection function $f_{opt.Class}$ for component class Class may take many forms. In one embodiment, $f_{opt.Class}$ might be a constant function, always selecting the same component or components. In other embodiments, $f_{opt.Class}$ might be comprised of arithmetic, statistical, probabilistic, or other mathematical functions performed upon multiple variables.

In this example, function $f_{opt.Class}$ (line 050) might select optimal component or components Optimal$_{Class}$ from the component class Class, by simply choosing the component assigned the highest or lowest weighting allocation Wt$_{Comp.Class}$.

Similarly, $f_{wt.Comp.Class}$ (line 030), which computes a weighting allocation for a component Comp.Class of component class Class, could be as simple as assigning a weighting of 1 to the component with the lowest operating temperature and 0 weighting values to other components.

In other embodiments, however, $f_{opt.Class}$ and $f_{wt.Comp.Class}$ may be complex functions or multi-step algorithms, and may be functions of many other factors that include, but are not limited to, the existence of error conditions, the rate of change of received values, ambient temperatures and humidity levels, the relative costs of powering or cooling different sites, or the criticality of different subsystems. In other embodiments, $f_{opt.Class}$ and $f_{wt.Comp.Class}$ may be functions of interactions among such factors.

In other embodiments, a load-balancer may receive one or more updated values at specific sampling times, wherein those sampling times may be variable or fixed, may vary independently for each environmental metric or environmentally insensitive factor, or may be continually updated as a function of a last-received value or of at least two previously received values of one or more environmental metrics. In another embodiment, one or more sampling times may be continually updated as a function of changes or rates of change in one or more of a last-received value or at least two previously received values of one or more environmental metrics.

In another embodiment, an environmentally aware task-allocation algorithm may decide how to allocate a task among components by considering environmentally sensitive metrics or environmentally insensitive factors related to components that belong in other classes. Such an algorithm might, for example, select a CPU by using the relative temperatures of hard drives located in different data centers to infer which facilities are running at an optimal temperature. In another example, an environmentally aware load balancer might select computers at one of several disaster-recovery sites in part by considering relative generator fuel levels at each site, In other embodiments, an environmentally aware task-allocation algorithm may combine more than one of these embodiments. A task-allocation algorithm might, for example, allocate tasks as a probability function of multiple environmentally sensitive values, environmentally insensitive factors, continually updated weightings, trends in one or more received values, and constants stored in a support table.

The task-allocation algorithm repeats the loop of lines 010-060 for each candidate class Class that the algorithm considers. In some embodiments, a task-allocation algorithm might skip classes or sub-classes of components or individual components if the algorithm does not require those classes or sub-classes of components or individual components to be considered. Upon completion of the final iteration of the loop of lines 010-060, the task-allocation algorithm will have computed or in some other way determined allocation weightings for all candidate components for which the algorithm will use weightings when selecting a balanced workload allocation.

In line 070, if an embodiment of the loop of lines 010-060 has selected more than one optimal component, a task-allocation algorithm may perform the additional step of selecting the best instance or instances Optimal$_{System}$ of Optimal$_{Class}$ (line 070), based on an implementation-dependent implementation of function $f_{opt.System}$.

In step 607 of FIG. 6, a task-allocation algorithm selects a balanced workload allocation using data that may include one or more optimal-component selections and allocation weightings that might have been generated in step 605. The finer details of this step are implementation-dependent and may be a function of considerations that include, but are not limited to, the exact configuration of the power-consuming system and the goals of the system designers. In all embodiments, this selection should ultimately result in a task-allocation decision that attempts to load-balance the power-consuming system and optimize the values of environmental metrics.

In Step 609, the task-allocation algorithm determines whether an error condition, such as a warning, alarm, or shutdown condition, exists. If such a condition exists, some embodiments of the algorithm will next execute step 611. Otherwise, they will execute step 613. In some embodiments, the task-allocation algorithm may make this determination after receiving values from environmental sensors 519-523 or 535-539 of FIG. 5, reading updated environmental values from one or more environmental data tables 509, or considering any other received, stored, or computed information, or any rules embedded in the algorithm itself.

In step 611, wherein the task-allocation algorithm has determined in step 609 that an error condition, such as a warning, alarm, or shutdown condition, exists, the task-allocation algorithm initiates one or more error-handling protocols, which may include notifying entities like a system user or administrator, a notification program, or system-management, network-management, or application software. In other embodiments, an error-handling protocol may comprise other actions that include, but are not limited to, modifying some of the task-allocation algorithm's rules, loading a different algorithm, reorganizing components into different classes or sub-classes, shutting down one or more components, or suspending the allocation of tasks to one or more components.

In another embodiment, an environmentally aware task-allocation algorithm might initiate one or more error-handling or notification protocols when received values reveal that a component is merely approaching an error state. In another embodiment, a human user or operator or an automated process might be allowed to manually route an incoming task or override a task-allocation algorithm-generated balanced workload allocation after receiving such notification.

In some embodiments, the balanced workload allocation is not communicated to a routing mechanism 505 when step 609 determines that an error condition exists, but in other embodiments, an independent decision may be made, despite the identification of the existence, probability, or imminence of an error condition, whether to communicate the previously computed balanced workload allocation, communicate a modified version of the balanced workload allocation, or postpone or cancel communication of the balanced workload allocation.

In step 613, wherein the task-allocation algorithm has determined in step 609 that no error condition exists, the balanced workload allocation is returned to the load-balancer, which communicates it, along with the task request, to one or more routing mechanisms in a form that allows the routing mechanism or mechanisms to route the task to an appropriate component or components.

In other embodiments, some of these steps may be performed in a different order. A task-allocation algorithm, for example, might not identify candidate components (step 603) before the algorithm has received updated environmental values from environmental sensors. In other embodiments, the task-allocation algorithm may not always need to generate one or more computed allocation weightings Wt in order to select a balanced workload allocation (steps 605-607). In other embodiments, the steps performed by the task-allocation algorithm may themselves be determined by received or stored values or by the state of some variable or the existence of some condition.

TABLE 7-1

Sample Environmental Data Table

| 1 Component | 2 T (° C.) | 3 Used (%) | 4 P (V-A) | 5 H (%) | 6 WL (%) |
|---|---|---|---|---|---|
| 2 CPU 1 | 47 | | | | |
| 3 CPU 2 | 35 | | | | |
| 4 Storage 1 | 36 | | | | |
| 5 Storage 2 | 24 | | | | |
| 6 Storage 3 | 24 | 68 | | | |
| 7 Storage 4 | 42 | 55 | | | |
| 8 Storage 5 | 42 | 22 | | | |
| 9 Cooler 1 | | | 840 | | |
| 10 Cooler 2 | | | 540 | | |
| 11 Dehumidifier | | | 660 | | 96 |
| 12 Zone 1 Ambient | 18.0 | | | 27 | |
| 13 Zone 2 Ambient | 18.4 | | | 24 | |

TABLE 7-2

Sample Support Table

| 1 Factor | 2 Zone | 3 Warning | 4 Alarm | 5 Shutdown |
|---|---|---|---|---|
| 2 T-Op (CPU1) | 1 | 46 | 51 | 54 |
| 3 T-Op (CPU2) | 1 | 46 | 51 | 54 |
| 4 T-Op (Storage1) | 1 | 38 | 42 | 46 |
| 5 T-Op (Storage2) | 1 | 38 | 42 | 46 |
| 6 T-Op (Storage3) | 2 | 38 | 42 | 46 |
| 7 T-Op (Storage4) | 2 | 38 | 42 | 46 |
| 8 T-Op (Storage5) | 2 | 38 | 42 | 46 |
| 9 P-Op (CPU1) | 1 | 38 | 42 | 46 |
| 10 P-Op (CPU2) | 2 | 38 | 42 | 46 |
| 11 Used (Storage1) | 1 | 70 | 25 | 18 |
| 12 Used (Storage2) | 2 | 70 | 25 | 18 |
| 13 Used (Storage3) | 2 | 75 | 12 | 8 |
| 14 Used (Storage4) | 2 | 75 | 12 | 8 |
| 15 Used (Storage5) | 2 | 75 | 12 | 8 |
| 16 P-Op (Dehumid) | 2 | 660 | 840 | 9.0 |
| 17 P-Op (cooler 1) | 1 | 852 | 1080 | 1200 |
| 18 P-Op (cooler 2) | 2 | 852 | 1080 | 1200 |
| 19 H-Amb | 2 | 45 | 65 | 80 |
| 20 T-Amb | 1 | 19 | 24.5 | 34.4 |
| 21 T-Amb | 2 | 19 | 24.5 | 34.4 |
| 22 WL | 2 | 90 | 95 | 100 |

TABLES 7-1 and 7-2 show exemplary portions of an embodiment of an environmental data table and a support table that could be incorporated into the embodiments of FIG. 5 and FIG. 6.

TABLE 7-1 shows a portion of an embodiment of an environmental data table 509 that might be integrated into the load-balancer 501 of FIG. 5. The contents of this table are continually updated with values received from environmental sensors like sensors 519-523 and 535-539 in FIG. 5.

The sample environmental data table depicted in TABLE 7-1 comprises values of environmental metrics that are received from the environmental sensors of FIG. 5. In other embodiments, some or all of these received values of environmental metrics may be stored in some other form or in multiple environmental data tables.

In the depicted embodiment, TABLE 7-1 stores received environmental values that include ° C. temperature T (col. 2), % of storage space used (col. 3), power consumption (col. 4), % humidity (col. 5), and dehumidifier reservoir water level (col. 6). Line 2 of TABLE 7-1, for example, lists the current operating temperature of CPU 1 at 47° C. and line 12 indicates that the ambient temperature in zone 1 is 18.0° C. This table structure may vary in other embodiments and is dependent upon considerations that include, but are not limited to, the configuration of the power-consuming system and the environmental sensors and the design and goals of the load-balancer.

In an embodiment, TABLE 7-2 shows a portion of a sample support table 511 that might be integrated into the environmentally aware load-balancer 501 of FIG. 5. The data stored in a support table may include constant values, variables that are continually updated with values read from non-environmental sensors or by other means, or any other type of data, other than the values received from environmental sensors, that may be used by task-allocation algorithm 503 to select a balanced workload allocation 507.

The classes of factors listed in TABLE 7-2, col. 1, include operating temperatures ("T-Op," lines 2-8), operating power consumption ("P-Op," lines 9-10, 17-18), % of used storage space ("Used," lines 11-15), ambient humidity ("H-Amb," line 19), ambient temperature ("T-Amb," lines 20-21), and dehumidifier reservoir water level ("WL," line 22).

For each factor listed in the embodiment of TABLE 7-2, the table contains entries that identify a related zone (col. 2) and threshold values that indicate warning (col. 3), alarm (col. 4), and component- or system-shutdown (col. 5) error conditions. In this embodiment, each stored threshold value is represented in the same units as the parameter that the threshold value is related to. Line 2, col. 3, for example, contains the warning threshold value 46 for parameter T-Op (CPU2) (Table 7-1, line 3, col. 2). Because T-Op (CPU2), for example, is stored in units of the threshold value stored in Table 7-2, line 2, col. 3, represents a threshold value of 46° C. In other embodiments, units may not be consistent in this same manner. In some embodiments, support tables may contain values that indicate different types of error conditions than the error conditions illustrated in TABLES 7-1 and 7-2, or may not contain any values that indicate or are related to error conditions.

Because the exact form and contents of a support table are implementation-dependent, embodiments of support tables may comprise different numbers of and types of entries that may be represented in different units. In embodiments that comprise computerized power-consuming systems, at least one of these stored entries may include, but are not limited to, CPU utilization, available RAM space, component age, remaining component lifespan, component criticality, or data-center power consumption.

In embodiments not limited to computerized power-consuming systems, a support table might track factors that include, but are not limited to, fuel or oil levels, last-recorded wear levels of consumable hardware, or the next scheduled equipment-maintenance date.

In some embodiments, each factor or entry in the support table may be assigned a default factor-weighting that may be used by the task-allocation algorithm when selecting a balanced workload allocation. These default factor-weightings may themselves be stored and updated in the support table.

In an example based on the embodiments of FIG. 5, FIG. 6, and TABLES 7-1 and 7-2, the operating temperature of CPU 1 has reached 47° C. ("T-Op(CPU1)", TABLE 7-1, line 2, col. 2), placing CPU 1 in a warning condition (by exceeding the threshold temperature value "Warning(T-Op(CPU1))" stored in TABLE 7-2, line 2, col. 3). During the existence of an error condition, embodiments of an environmentally aware task-allocation algorithm may respond in different ways to a request for CPU resources.

In one such embodiment, the task-allocation algorithm may execute lines 110-170 below to compute allocation weightings Wt and to select one or more optimal components Optimal$_{System}$ (step 605 in FIG. 6).

```
110      FOR Class =1 TO #Classes
120          FOR Comp =1 TO #Comps_Class
130              Wt_Comp.Class = TRUE [T-Op(Comp.Class) <=
                     Warning(T-Op(Comp.Class)) ]
140          NEXT Comp
150          Optimal_Class[ ] = MAXSET [Class]
160      NEXT Class
170      Optimal_System = SEL [Optimal_1, Optimal_2 . . . ]
```

Here, in line 130, the algorithm defines a simple instance of function $f_{wt.Comp.Class}$ (described above in line 030) that returns a value of 1 for any component Comp that is operating at a temperature T-Op that is less than or equal to the threshold temperature Warning(T-Op(Comp.Class)) set for that component Comp in TABLE 7-2, col. 3. If a component Comp exceeds that warning temperature, the TRUE function of line 130 returns an allocation weighting of 0.

In this embodiment, line 150 uses these weightings to select one or more optimal components for component class Class. In this example, line 150 embodies function $f_{opt.Class}$ (described above in line 050) as a defined function MAXSET that returns the set of allocation weightings $Wt_{Comp.Class}$ for components in component class Class that are equal to the highest value assigned any weighting $Wt_{Comp.Class}$ in class Class.

In this example, line 170 embodies function $f_{opt.System}$ (described above in line 070) as a defined function SEL that selects one or more optimal components from the sets of components selected by the iterations of MAXSET in line 150. In embodiments, a task-allocation algorithm might perform this task by considering additional criteria like ambient temperature or CPU utilization or interactions between such criteria, by implementing a custom algorithm, or by simply defaulting to a round-robin allocation among the components selected by MAXSET.

Embodiments presented here comprise the MAXSET instance of function $f_{opt.Class}$ and the SEL instance of function $f_{opt.System}$. But other embodiments may comprise more complex instances of these two functions that may themselves be algorithms, steps of a method, or complex functions of environmental values, nonenvironmental factors, constant or variable preset values, other functions, or any other computational entities deemed by system designers to model aspects of the power-consuming system and the manner in which tasks should be routed under implementation-specific conditions. Other embodiments may vary formally from the algorithm of steps 010-070 to the extent that they do not include distinct functional steps analogous to $f_{opt.Class}$ or $f_{opt.System}$.

In some embodiments, for example, instances of $f_{opt.Class}$ or $f_{opt.System}$ might assign additional component weightings for purposes that might include helping to determine how a severable task should be split among multiple components, or how to choose which of several optimal components should receive a single incoming task. In other embodiments, instances of one or both of these functions might comprise steps that account for interactions among components that may belong to different classes, such as adjusting the priority given to one or more higher-efficiency members of a group of fuel-powered components as a function of the fuel level of a fuel-storage resource. In other embodiments, instances of $f_{opt.Class}$ or $f_{opt.System}$ might, under some conditions, adjust their environmentally driven results as functions of nonenvironmental considerations, such as relative component operating costs, power costs, or relative ages of components.

A simpler embodiment of the load-balancer of FIGS. 5 and 6 and TABLES 7-1 and 7-2 might respond to the warning condition triggered by CPU 1's 47° C. operating temperature ("T-Op(CPU1)", TABLE 7-1, line 2, col. 2 and "Warning(T-Op(CPU1))", TABLE 7-2, line 2, column 3) by unconditionally notifying a system operator that CPU 1 needs to be monitored or that some other action needs to be taken to avoid damaging the component or otherwise compromising the operation or efficiency of the power-consuming system or any system components.

A more granular embodiment that implements the algorithm of lines 110-170 would execute the function of line 130 to assign overheating CPU 1 an allocation weight of 0 (because T-Op(CPU1)>Warning(T-Op(CPU1))), and assign an allocation weight of 1 to CPU 2, which satisfies the TRUE function of line 130 by operating at a safe T-Op(CPU2) value of 35° C. (TABLE 7-1, line 3, col. 2 and TABLE 7-2, line 3, col. 3). Because CPU 2 has the highest task-allocation weighting, the MAXSET function of line 150 would then select CPU 2 as the sole optimal component Optimal$_{Class}$ in class Class. If Class is the only component class in the power-consuming system, the SEL function of line 170 would then select CPU 2 as the optimal component Optimal$_{System}$ for the entire system.

The load-balancer embodied in this simplified example would thus begin routing all incoming processor tasks to CPU 2 until T-Op(CPU1) drops to the 46° C. warning threshold or until the operating temperature of CPU 2 triggers another error condition.

In other examples, other instances of the $f_{wt.Comp.Class}$ function of line 030 may compute more nuanced allocation weightings or base weighting computations upon additional factors.

In one such embodiment, an environmentally aware task-allocation algorithm may intelligently adjust a weighting as a function of how close a received value is to a threshold limit. Line 130, for example, might define an instance $Wt_{Comp.CPU}$ of function $f_{wt.Comp.Class}$ of function that calculates allocation weightings for CPU components in the component class CPU as functions of the number of degrees by which the operating temperature T-Op(Comp.CPU) of a component Comp.CPU of class CPU exceeds threshold temperature Warning(T-Op (Comp.CPU)).

In one such embodiment, the probability of selecting a warm CPU might decrease with every degree of temperature increase above a threshold value. Such a variably weighted approach might be used to preemptively avoid errors when components approach an error condition and, in some embodiments, may be extended to other environmental metrics and other nonenvironmental factors. Consider, for example, the following embodiment of function $Wt_{Comp.CPU}$ on line 130:

$Wt_{Comp.CPU}$=TRUE[*T-Op*(Comp.CPU)<=Warning(*T-Op*(Comp.CPU))]−MAX[0,*T-Op*(Comp.CPU)−Warning(*T-Op*(Comp.CPU))]

Here, as before, the TRUE function assigns CPU component Comp.CPU an allocation weighting of 1 if Comp.CPU's operating temperature does not exceed the warning threshold Warning(T-Op(Comp.CPU)) specified in TABLE 7-2 col. 3. And also, as before, a CPU component is assigned an allocation weighting of 0 if that component's operating temperature does exceed the warning threshold of TABLE 7-2, col. 3. But now, $Wt_{Comp.CPU}$ includes an additional function MAX that decreases the weightings of overheating components by the number of degrees by which that component's T-Op(Comp.CPU) operating temperature exceeds the component's Warning(T-Op(Comp.CPU)) threshold temperature. Here, the MAX function returns the greater of 0 or the difference between component Comp.CPU's operating and threshold warning temperatures. If the component has not exceeded the warning threshold, MAX returns zero. If the component has exceeded the warning threshold, the MAX function decreases the value returned by the TRUE function (which is 0) by the number of degrees by which the component's operating temperature has exceeded the component's parameter's warning threshold.

In one example, CPU 1, which has been assigned a Warning(T-Op(CPU1)) threshold temperature value of 46° C., is operating at a safe T-Op(CPU1) of 36 degrees (not shown in the TABLES). Under these conditions, the function $Wt_{CPU1}$ described above would compute an allocation weighting of:

$$Wt_{CPU1} = \text{TRUE}[T\text{-}Op(CPU1) <= \text{Warning}(T\text{-}Op(CPU1))] -$$
$$\text{MAX}\{0, T\text{-}Op(CPU1) - \text{Warning}(T\text{-}Op(CPU1))\}$$
$$Wt_{CPU1} = \text{TRUE}[36 <= 46] - \text{MAX}[0, (36\text{-}46)] =$$
$$1 - \text{MAX}[0, -10] = 1 - 0 = 1$$

And if CPU 2 is operating at 47 degrees (not shown in the TABLES), CPU 2's allocation weighting $Wt_{CPU2}$ would be:

$$Wt_{CPU2} =$$
$$\text{TRUE}[47 <= 46] - \text{MAX}[0, (47\text{-}46)] = 0 - \text{MAX}[0, 1] = 0 - 1 = -1$$

The MAXSET function of line 150 would thus select CPU 1 as the optimal component $Optimal_{Class}$ of class Class because CPU 1's allocation weighting of 1 is greater than the overheating CPU 2's weighting of –1.

In a variation of this example, using the same functional definitions, if the operating temperature of CPU 1 subsequently rose to 49 degrees (not shown in the TABLES), CPU 1's allocation weighting $Wt_{CPU1}$ would become:

$Wt_{CPU1}$=TRUE[49<=46]-MAX[0,(49-46)]=0-3=-3

The MAXSET function of line 150 would now select CPU 2 as the optimal component because CPU 2's allocation weighting of –1 is greater than CPU 1's weighting of –3. Variations of this embodiment allow a task-allocation algorithm to assign weightings to components that share the same error condition based on the severity of their error state.

In other embodiments, many other factors and functions can be integrated into instances of weighting-computation function $f_{wt.Comp.Class}$ (line 030) and optimal class-component selection function $f_{opt.Class}$ (line 050), and any of those factors and functions can themselves be weighted according to their importance to a particular implementation of a power-consuming system. In other embodiments, a task-allocation algorithm may employ different types of computational approaches that may not include the computation or assignment of weightings to components.

In another embodiment, an instance of function $f_{wt.Comp.Class}$ (line 030) might depend upon additional factors that may include but are not limited to ambient air temperature, free disk space, or CPU utilization. Consider, for example, the following instance $Wt_{CPU+}$ of $f_{wt.Comp.Class}$: that computes a task-allocation weighting for component Comp.CPU of component class CPU:

$Wt_{CPU+}$=TRUE[$T$-$Op$(Comp.CPU)<=Warning($T$-$Op$
 (Comp.CPU))]-MAX[0,$T$-$Op$(Comp.CPU)-
 Warning($T$-$Op$(Comp.CPU))]-MAX[0,$H$-Amb-
 Warning($H$-Amb)]-MAX[0,Util(Comp.CPU-
 Warning(Util(Comp.CPU)]

Here, the parameter Util(CPU1) represents the % CPU utilization of CPU 1 and the parameter Warning(Util(CPU1)) is the threshold % of CPU utilization that triggers a warning condition for CPU 1. H-Amb represents the % ambient humidity at the data center in which CPU 1 is located and Warning(H-Amb) is the threshold humidity % value of H-Amb that triggers a warning condition. These parameters may not be shown in TABLES 7-1 and 7-2.

We can shorten this function by defining a shorthand OVR [x] function that returns the # of units by which the value of a parameter or metric x meets or exceeds the warning threshold value Warning(x). If x does not exceed this warning threshold value, OVR[x]=0. When performed on component CPU 1, this substitution would yield the following instance of function $Wt_{CPU+}$:

$Wt_{CPU1}$=TRUE[$T$-$Op$(CPU1)<=Warning($T$-$Op$
 (CPU1))]-OVR[T-$Op$(CPU1)]-OVR[$H$-Amb)]-
 OVR[Util(CPU1)]

In one example wherein a task-allocation algorithm uses the above function, CPU1 and CPU2 are located at two geographically distinct sites (not shown in the figures or tables). We further define H-Amb1 to represent the % ambient humidity at the data center in which CPU 1 is located and Warning (H-Amb1) to be the threshold humidity % value of H-Amb1 that triggers a warning condition. Similarly, we define H-Amb2 to represent the % ambient humidity at the data center in which CPU 2 is located and Warning(H-Amb2) to be the threshold humidity % value of H-Amb2 that triggers a warning condition.

We further assume the following values:
T-Op(CPU1)=47° C.
Warning(T-Op(CPU1))=46° C.
H-Amb1=55%
Warning(H-Amb1)=45%
Util(CPU1)=62%
Warning(Util(CPU1))=70%

Inserting these values into $Wt_{CPU1}$ yields the following task-allocation weighting for CPU 1:

$$Wt_{CPU1} = \text{TRUE}[47 <= 46] - OVR[T\text{-}Op(CPU1)] - OVR[H\text{-}Amb1] -$$
$$OVR[Util(CPU1)]$$
$$Wt_{CPU1} = 0 - (47\text{-}46) - (55\text{-}45) - 0$$
$$= 0 - 1 - 10 - 0$$
$$= -11$$

We further assume the below values for CPU 2:
T-Op(CPU2)=48° C.
Warning(T-Op(CPU2))=46° C.

H-Amb1=35%
Warning(H-Amb2)=45%
Util(CPU2)=26%
Warning(Util(CPU2))=70%

Inserting these values into $Wt_{CPU2}$ yields the following task-allocation weighting for CPU 2:

$$Wt_{CPU2} = \text{TRUE}[48 <= 46]OVR - [T\text{-}Op(CPU2)] - OVR[H\text{-}Amb2] - OVR[Util(CPU2)]$$

$$Wt_{CPU2} = 0 - (48\text{-}46) - 0 - 0$$
$$= 0 - 2 - 0 - 0$$
$$= -2$$

Here, CPU 2's allocation of −2 is greater than CPU 1's weighting of −11. If component class CPU consists solely of components CPU 1 and CPU 2, line 150's MAXSET embodiment of line 050's optimal class-component selection function $f_{opt.Class}$ would thus select CPU 2 as the sole optimal component $Optimal_{CPU}$ of class CPU.

This embodiment illustrates how implementation-dependent factors can alter the way that a task-allocation algorithm interprets received environmental values. Here, for example, CPU 2 is selected as optimal despite having the higher operating temperature because the excess ambient humidity at CPU 1's site is deemed to be an overriding factor.

In other embodiments, any of the parameters used to derive allocation weightings or to select optimal components may themselves be weighted in order to better model their relative real-world importance to the power-consuming system. If, for example, ambient humidity was judged to be only 5% as important as other parameters, the functional parameter OVR [H-Amb)] in the preceding example might be weighted by a factor of 0.05.

As shown below, such an embodiment would, given the CPU 1-related and CPU 2-related values listed above, produce a higher allocation rating for CPU 1, resulting in the selection of CPU 1, rather than CPU 2, as an optimal component for component class Class.

$$Wt_{Comp,CPU} =$$
$$\text{TRUE}[T\text{-}Op(Comp.CPU) <= \text{Warning}(T\text{-}Op(Comp.CPU))] -$$
$$OVR[T\text{-}Op(Comp.CPU)] -$$
$$.05 * OVR[H\text{-}Amb] - OVR[Util(Comp.CPU)]$$

$$Wt_{CPU1} = \text{TRUE}[T\text{-}Op(CPU1) <= \text{Warning}(T\text{-}Op(CPU1))] -$$
$$OVR[T\text{-}Op(CPU1)] - .05 * OVR[H\text{-}Amb1] - OVR[Util(CPU1)] =$$
$$\text{TRUE}[47 <= 46] - OVR[47\text{-}46] - 0.5 * OVR[55\text{-}45] - OVR[62\text{-}70] ==$$
$$0 - 1 - .05 * 10 - 0 = -1.5$$

$$Wt_{CPU2} = \text{TRUE}[T\text{-}Op(CPU2) <= \text{Warning}(T\text{-}Op(CPU2))] -$$
$$OVR[T\text{-}Op(CPU2)] - .05 * OVR[H\text{-}Amb2] - OVR[Util(CPU2)] =$$
$$\text{TRUE}[48 <= 46] - OVR[48\text{-}46] - 0.5 * OVR[35\text{-}45] - OVR[26\text{-}70] =$$
$$0 - 2 - 0 - 0 = -2$$

The embodiments discussed above can be generalized to other classes of components. Consider, for example, an embodiment of load-balancer 501 of FIG. 5 that receives a request for storage resources triggered by a user-initiated video-recording or system-backup operation. In this case, a simpler task-allocation algorithm might respond by selecting the storage unit in zone 2's storage farm that has the largest amount of available storage space. In the example of TABLE 7-1, lines 6-8, col. 3, storage unit 5, which has consumed only 22% of the unit's storage capacity, would be selected before units storage 3 or storage 4, which have much less available space.

In another embodiment, a more sophisticated environmentally aware task-allocation algorithm, before selecting storage 5, might first consider other parameters, such as storage unit 5's operating temperature T-Op(Storage5) (TABLE 7-2, line 8, col. 3). Here, although storage 3 is operating at a comfortable 24° C. ((T-Op(Storage3), TABLE 7-1, line 6, col. 2), well below storage 3's 38° C. warning threshold temperature (Warning(T-Op(Storage3), TABLE 7-2, line 6, col. 3), storage units 4 and 5 are running at T-Ops of 42° C. (TABLE 7-1, lines 7-8, col. 2), initiating a warning condition by exceeding their 38° C. threshold temperatures (TABLE 7-2, lines 7-8, col. 3).

Embodiments of an environmentally aware task-allocation algorithm might address such situations, wherein consideration of different parameters results in the selection of different optimal components, by prioritizing certain parameters. Other embodiments may incorporate steps that further adjust these priorities as functions of the values of some parameters.

A task-allocation algorithm might, for example, assign greater importance to storage 5's 4° temperature error than to the storage unit's limited storage capacity, but might make an opposite decision if the storage unit's operating temperature was only 1° over a threshold value. Other algorithms might perform different analyses, or introduce other tie-breaking factors as appropriate to a particular system implementation and load-balancing strategy.

In another embodiment, an environmentally aware task-allocation algorithm might consider criticality weightings assigned to each component in order to better account for the relative importance of each component in the power-consuming system. If two CPUs, for example, are equally suited to receive a task request, such an algorithm might choose the one deemed to be a less-critical resource.

In the above embodiments, after a task-allocation algorithm has assigned all candidate-component task-allocation weightings, the algorithm may select optimal components and a balanced workload allocation by further manipulating and comparing those weightings.

In other embodiments, optimal components and balanced workload allocations may be selected by rules and manipulations that may not always consider component task-allocation weightings, or may employ mathematical or algorithmic methodologies that may allocate at least some tasks without considering some or all allocation weightings.

Environmentally aware load-balancers may also comprise some or all elements of traditional load-balancers. In an embodiment, an environmentally aware task-allocation algorithm might default to a simpler round-robin allocation when the algorithm confirms that no components are at risk for overheating or that the system or one or more system components otherwise satisfy some load-balancing criteria.

Many other methods of selecting balanced workload allocations may be incorporated into embodiments of an environmentally aware load-balancer and task-allocation algorithm, wherein those other methods depend upon implementation specifics that may include, but are not limited to, the goals of and resources available to system designers and the configuration of the power-consuming system and load-balancer and their associated sensors, components, subsystems, and communications environment.

In all cases, though, the implementation-dependent details of a task-allocation algorithm's method of selecting a balanced workload allocation are within the scope of understanding of a person skilled in the art of system design who is familiar with the configuration of the power-consuming system. In some embodiments, a task-allocation algorithm may be a straightforward translation of a system designer's characterizations of the relative importance of each component and of the relative importance of specific types of error conditions to each component, class of components, and subsystem, and to the power-consuming system itself.

Many other embodiments are possible, but the defining characteristic of the present invention is the load-balancer's ability to intelligently base load-balancing decisions at least in part on the values of multiple, continually updated, environmentally sensitive metrics received from environmental sensors.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for allocating one or more task workloads of a plurality of task workloads to one or more components of a plurality of components of a multi-component power-consuming system coupled to a routing mechanism, wherein components of the plurality of components that are of a similar class are organized into an associated subsystem, and wherein a memory stores an environmental data table, a support table, and a task-allocation algorithm, wherein each of the plurality of components of the multi-component power-consuming system is associated with one or more environmental sensors, and with a plurality of non-environmental logging mechanisms, wherein the one or more environmental sensors identify one or more environmental characteristics associated with a set of operating environments of its associated component and continually update one or more environmental values associated with the one or more environmental characteristics of its associated component in the environmental data table, wherein each of the plurality of non-environmental logging mechanism identifies one or more non-environmental characteristics of its associated component and continuously updates one or more non-environmental values associated with the one or more non-environmental characteristics in the support table, the method comprising:

a processor of a computer system receiving a task request that comprises the one or more task workloads, the processor, in response to receiving the task request, launching the task-allocation algorithm by selecting a balanced workload allocation of a plurality of balanced workload allocations as a function of one or more values stored in the environmental data table and the support table;

wherein the task-allocation algorithm comprises an optimal predefined set of rules that determines how the routing mechanism should allocate the one or more task workloads among at least two components of the plurality of components, wherein the determining comprises identifying one or more classes of components of the plurality of components, wherein the one or more classes of components are candidate components to receive the one or more task workloads, and wherein components or subsystems comprised by a class of the one or more classes of components are each associated with a same class of the one or more classes, wherein the task-allocation algorithm computes, for each of the candidate components, an allocation weighting of a plurality of allocation weightings as a function of at least one of the one or more environmental values, wherein the task-allocation algorithm may alter the selected balanced workload allocation, and wherein the selected balanced workload allocation comprises an optimal predefined set of rules that determine how the routing mechanism should allocate the one or more task workloads among the at least two components, and wherein the selecting is performed as a further function of a first weighting of the plurality of task-allocation weightings, wherein the first weighting revises the optimal predefined set of rules, wherein the first weighting is associated with one of the at least two components, and wherein a weighting rule of the optimal predefined set of rules is a rule that instructs the routing mechanism to update the value of the first weighting, and the processor choosing a first communication time, wherein the choosing is a function of at least one previously received value of a tracked environmental factor of the set of environmental factors and is a further function of at least one value previously received from a logging mechanism of the plurality of non-environmental logging mechanisms; and the processor communicating the selected balanced workload allocation and the task request at the first communication time to the routing mechanism such that the routing mechanism allocates the one or more task workloads among the at least two components, wherein the first environmental value of the one or more environmental values comprises an outdoor temperature outside a facility in which a component of the at least two components is operating and wherein a first updated non-environmental value of the continuously updated one or more non-environmental values comprises a local time zone at the facility.

2. The method of claim 1, wherein neither of the at least two components is the computer system and wherein neither of the at least two components is a component of a computer system.

3. The method of claim 1, further comprising providing at least one support service for at least one of creating, integrating, hosting, maintaining, and deploying computer-readable program code in the computer system, wherein the computer-readable program code in combination with the computer system is capable of performing the receiving, launching, choosing, and communicating.

4. A computer program product, comprising a memory having a computer readable program code stored therein, said computer readable program code comprising a method for allocating one or more task workloads of a plurality of task workloads to one or more components of a plurality of components of a multi-component power-consuming system coupled to a routing mechanism, wherein components of the plurality of components that are of a similar class are organized into an associated subsystem, and wherein the memory stores an environmental data table, a support table, and a task-allocation algorithm, wherein each of the plurality of components of the multi-component power-consuming system is associated with one or more environmental sensors, and with a plurality of non-environmental logging mechanisms, wherein the one or more environmental sensors identify one or more environmental characteristics associated with a set of operating environments of its associated component and continually update one or more environmental values associated with the one or more environmental characteristics of its associated component in the environmental data table, wherein each of the plurality of non-environmental logging mechanisms identifies one or more non-environmental characteristics of its associated component and continuously updates one or more non-environmental values associated with the one or more non-environmental characteristics in the support table, the method comprising:

the processor receiving a task request that comprises the one or more task workloads, the processor, in response to receiving the task request, launching the task-allocation algorithm by selecting a balanced workload allocation of a plurality of balanced workload allocations as a function of one or more values stored in the environmental data table and the support table;

wherein the task-allocation algorithm comprises an optimal predefined set of rules that determines how the routing mechanism should allocate the one or more task workloads among at least two components of the plurality of components, wherein the determining comprises identifying one or more classes of components of the plurality of components, wherein the one or more classes of components are candidate components to receive the one or more task workloads, and wherein components or subsystems comprised by a class of the one or more classes of components are each associated with a same class of the one or more classes, wherein the task-allocation algorithm computes, for each of the candidate components, an allocation weighting of a plurality of allocation weightings as a function of at least one of the one or more environmental values, wherein the task-allocation algorithm may alter the selected balanced workload allocation, and wherein the selected balanced workload allocation comprises an optimal predefined set of rules that determine how the routing mechanism should allocate the one or more task workloads among the at least two components, and wherein the selecting is performed as a further function of a first weighting of the plurality of task-allocation weightings, wherein the first weighting revises the optimal predefined set of rules, wherein the first weighting is associated with one of the at least two components, and wherein a weighting rule of the optimal predefined set of rules is a rule that instructs the routing mechanism to update the value of the first weighting, and the processor choosing a first communication time, wherein the choosing is a function of at least one previously received value of a tracked environmental factor of the set of environmental factors and is a further function of at least one value previously received from a logging mechanism of the plurality of non-environmental logging mechanisms; and the processor communicating the selected balanced workload allocation and the task request at the first communication time to the routing mechanism such that the routing mechanism allocates the one or more task workloads among the at least two components, wherein the first environmental value of the one or more environmental values comprises an outdoor temperature outside a facility in which a component of the at least two components is operating and wherein a first updated non-environmental value of the continuously updated one or more non-environmental values comprises a local time zone at the facility.

5. The computer program product of claim 4, wherein neither of the at least two components is the computer system and wherein neither of the at least two components is a component of a computer system.

6. A computer system comprising a processor, a memory coupled to the processor, and a computer readable hardware storage device coupled to said processor, wherein the storage device stores program code configured to be executed by the processor via the memory to implement a method for allocating one or more task workloads of a plurality of task workloads to one or more components of a plurality of components of a multi-component power-consuming system coupled to a routing mechanism, wherein components of the plurality of components that are of a similar class are organized into an associated subsystem, and wherein the memory stores an environmental data table, a support table, and a task-allocation algorithm, wherein each of the plurality of components of the multi-component power-consuming system is associated with one or more environmental sensors, and with a plurality of non-environmental logging mechanisms, wherein the one or more environmental sensors identify one or more environmental characteristics associated with a set of operating environments of its associated component and continually update one or more environmental values associated with the one or more environmental characteristics of its associated component in the environmental data table, wherein each of the plurality of non-environmental logging mechanisms identifies one or more non-environmental characteristics of its associated component and continuously updates one or more non-environmental values associated with the one or more non-environmental characteristics in the support table, the method comprising:

the processor receiving a task request that comprises the one or more task workloads, the processor, in response to receiving the task request, launching the task-allocation algorithm by selecting a balanced workload allocation of a plurality of balanced workload allocations as a function of one or more values stored in the environmental data table and the support table;

wherein the task-allocation algorithm comprises an optimal predefined set of rules that determines how the routing mechanism should allocate the one or more task workloads among at least two components of the plurality of components, wherein the determining comprises identifying one or more classes of components of the plurality of components, wherein the one or more classes of components are candidate components to receive the one or more task workloads, and wherein components or subsystems comprised by a class of the one or more classes of components are each associated with a same class of the one or more classes, wherein the task-allocation algorithm computes, for each of the candidate components, an allocation weighting of a plurality of allocation weightings as a function of at least one of the one or more environmental values, wherein the task-allocation algorithm may alter the selected balanced workload allocation, and wherein the selected balanced workload allocation comprises an optimal predefined set of rules that determine how the routing mechanism should allocate the one or more task workloads among the at least two components, and wherein the selecting is performed as a further function of a first weighting of the plurality of task-allocation weightings, wherein the first weighting revises the optimal predefined set of rules, wherein the first weighting is associated with one of the at least two components, and wherein a weighting rule of the optimal predefined set of rules is a rule that instructs the routing mechanism to update the value of the first weighting, and the processor choosing a first communication time, wherein the choosing is a function of at least one previously received value of a tracked environmental factor of the set of environmental factors and is a further function of at least one value previously received from a logging mechanism of the plurality of non-environmental logging mechanisms; and the processor communicating the selected balanced workload allocation and the task request at the first communication time to the routing mechanism such that the routing mechanism allocates the one or more task workloads among the at least two components, wherein the first environmental value of the one or more environmental values comprises an outdoor temperature outside a facility in which a component of the at least two components is operating and wherein a first updated non-environmental value of the continuously updated one or more non-environmental values comprises a local time zone at the facility.

7. The computer system of claim 6, wherein neither of the at least two components is the computer system and wherein neither of the at least two components is a component of a computer system.

\* \* \* \* \*